United States Patent

[11] 3,609,217

| | | |
|---|---|---|
| [72] | Inventor | Piero Gaja<br>Turin, Italy |
| [21] | Appl. No. | 868,486 |
| [22] | Filed | Oct. 22, 1969 |
| [45] | Patented | Sept. 28, 1971 |
| [73] | Assignee | Cear S.p.A<br>Turin, Italy |
| [32] | Priority | Oct. 23, 1968 |
| [33] | | Italy |
| [31] | | 53592 A/68 |

[54] ELECTRIC SUPPLY CABLES FOR ELECTRIC FURNACES
2 Claims, 1 Drawing Fig.

[52] U.S. Cl....................................... 174/120,
57/153, 117/75, 117/79, 117/132, 161/175
[51] Int. Cl........................................ H01b 7/00
[50] Field of Search........................... 161/144,
175, 176, 189; 117/75, 79, 132 CF, 232; 174/110,
120, 121; 260/87.7; 57/145, 153

[56] References Cited
UNITED STATES PATENTS

| | | | |
|---|---|---|---|
| 3,051,677 | 8/1962 | Rexford........................ | 260/87.7 |
| 3,275,739 | 9/1966 | Eager, Jr. .................... | 174/110 R |
| 3,324,280 | 6/1967 | Cheney et al................ | 117/75 |
| 3,467,636 | 9/1969 | Nersasian.................... | 260/87.7 |

*Primary Examiner*—Robert F. Burnett
*Assistant Examiner*—Linda M. Carlin
*Attorney*—Young & Thompson ABSTRACT: Supply cables for electric furnaces, of the type in which a number of metal filaments are embedded in a neoprene casing, are protected against high heat and are made wear resistant, by forming on the neoprene sheath an outer sheathlike covering of a copolymer of vinylidene fluoride and hexafluoropropylene.

PATENTED SEP28 1971
3,609,217
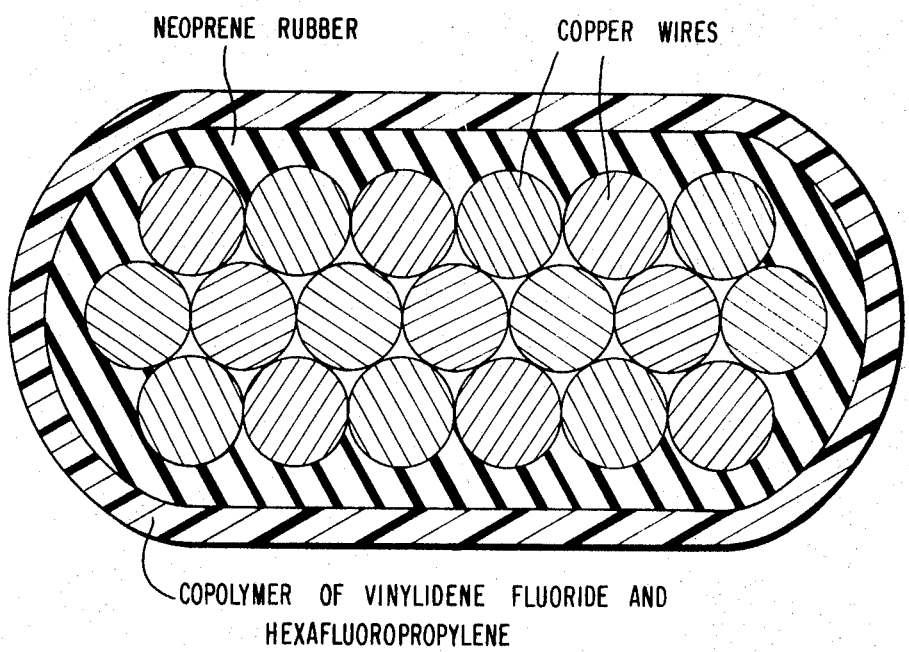
INVENTOR
PIERO GAJA
BY *Young & Thompson*
ATTORNEYS

ELECTRIC SUPPLY CABLES FOR ELECTRIC FURNACES

The present invention relates to electric supply cables for electric furnaces. Such cables transmit current of low voltage but very high amperage. The cables are fixed at one end and are connected to the electrode or electrodes at the other end, so that they can move during the operation and thus follow the melting of the materials in the furnace.

However, such cables in the past have been undesirably subject to heat damage, as well as to frictional damage from rubbing against each other and against stationary surfaces. A plurality of such cables are used, and their lengths are different; therefore, it is not a simple matter to replace damaged cables in this environment.

Accordingly, it is an object of the present invention to provide an electric supply cable for electric furnaces having good wear resistance.

Another object of the present invention is the provision of an electric supply cable for electric furnaces having high heat resistance.

Finally, it is an object of the present invention to provide electric supply cables for electric furnaces, which will be relatively simple and inexpensive to manufacture, easy to install, maintain and repair, and rugged and durable in use. Briefly, these objects are achieved by providing, on the neoprene rubber sheath that covers the metal filaments, a second and outermost sheath of copolymer of vinylidene fluoride and hexafluoropropylene.

Other features, objects and advantages of the invention will become apparent from a consideration of the following description, taken in connection with the accompanying drawing, which is an enlarged schematic cross-sectional representation of a cable according to the present invention, it being understood that the cable can be of indeterminate length and will have substantially the same cross section represented in the FIGURE.

Referring now to the drawing in greater detail, there is shown in highly schematic and enlarged cross section a cable according to the present invention. It will be understood that the cable is substantially uniform throughout its length and is of undeterminate length, so that the cross section shown in the drawing suffices for and substantially represents the cross section of the entire length of the cable.

The conductive core of the cable is made up of the usual copper wires or other conductive metal, surrounded as usual by a sheath of chlorinated elastomer, preferably neoprene rubber, that is, polychloroprene, whose molecular weight is difficult to assess with accuracy but is ordinarily believed to lie in the range of 100,000 to 300,000. Further description of the rubber coating of the copper wires need not be given here, as this is quite conventional in the art of electrical conductors.

Thus, the copper wires and inner coating of neoprene rubber shown in the drawing can be quite conventional and need not be any different from what is ordinarily used in this art.

The present invention consists in the discovery that the improved properties recited above can unexpectedly be achieved, if the inner rubber sheath is coated with an outer sheath of a copolymer of a fluorinated elastomer, namely, a copolymer of vinylidene fluoride and hexafluoropropylene. This is represented schematically as the outer sheath shown in the drawing. A particular example of copolymer useful in the practice of the present invention is Du Pont's "Viton A," containing about 65 percent fluorine, having a specific gravity of 1.85, a Mooney viscosity of 35–45, a relatively low molecular weight that is difficult to describe quantitatively, and solubility in ketones.

The copolymer second or outer sheath can be applied to the cable by conventional rubber extrusion coating processes. Alternatively, the cable can be clad with a sheet of copolymer which can be bonded thereto by use of the usual rubber cements.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. An electric supply cable for electric furnaces, comprising a bundle of conductive metal filaments coated with a sheath of neoprene rubber, and a coating of a copolymer of vinylidene fluoride and hexafluoropropylene covering said coating of neoprene rubber.

2. A cable as claimed in claim 1, said copolymer containing about 65 percent fluorine and having a specific gravity of 1.85 and a Mooney viscosity of 35–45.

UNITED STATES PATENT OFFICE
CERTIFICATE OF CORRECTION

Patent No. 3,609,217  Dated September 28, 1971

Inventor(s) Piero Gaja

It is certified that error appears in the above-identified patent and that said Letters Patent are hereby corrected as shown below:

On the cover sheet [73] "Cear S.p.A." should read -- CEAT S.p.A. --.

Signed and sealed this 5th day of September 1972.

(SEAL)
Attest:

EDWARD M. FLETCHER, JR.　　　　　　　ROBERT GOTTSCHALK
Attesting Officer　　　　　　　　　　Commissioner of Patents